(12) United States Patent
Gagnon et al.

(10) Patent No.: US 9,446,455 B2
(45) Date of Patent: Sep. 20, 2016

(54) DRILLING APPARATUS

(71) Applicant: Sanexen Environmental Services, Inc., Brossard (CA)

(72) Inventors: Gilles Gagnon, Repentigny (CA); Martin Bureau, Montréal (CA); David Gilbert, St-Hyacinthe (CA); Charles Moisan-Willis, Gatineau (CA); Bruno Pelletier, Repentigny (CA)

(73) Assignee: Sanexen Environmental Services Inc., Brossard (CA)

( * ) Notice: Subject to any disclaimer, the term of this patent is extended or adjusted under 35 U.S.C. 154(b) by 52 days.

(21) Appl. No.: 14/289,702

(22) Filed: May 29, 2014

(65) Prior Publication Data

US 2015/0343538 A1   Dec. 3, 2015

(51) Int. Cl.

| | |
|---|---|
| F16L 55/26 | (2006.01) |
| B23B 45/00 | (2006.01) |
| B23B 45/04 | (2006.01) |
| B23B 41/00 | (2006.01) |
| E03F 7/12 | (2006.01) |
| F16L 55/18 | (2006.01) |

(Continued)

(52) U.S. Cl.
CPC ............ B23B 45/005 (2013.01); B23B 41/00 (2013.01); B23B 45/04 (2013.01); E03F 7/12 (2013.01); F16L 55/18 (2013.01); F16L 55/265 (2013.01); B23B 2260/068 (2013.01); B23B 2270/025 (2013.01); B23B 2270/027 (2013.01); B23B 2270/34 (2013.01); E03F 2003/065 (2013.01); E21B 43/112 (2013.01); F16L 55/179 (2013.01); Y10T 408/665 (2015.01)

(58) Field of Classification Search
CPC ..... F16L 55/265; F16L 55/179; F16L 55/26; F16L 55/18; F16L 210/10; E03F 2003/065; E21B 43/112; E21B 29/06; E21B 7/04; E21B 7/06; E21B 7/061; E21B 7/062; E21B 7/064; E21B 7/065; E21B 7/067; E21B 7/068; Y10T 409/304422; Y10T 408/665; Y10T 409/304424
USPC ................. 405/184.1, 184.2; 166/55.7, 55.8; 138/97, 98
See application file for complete search history.

(56) References Cited

U.S. PATENT DOCUMENTS

| | | | |
|---|---|---|---|
| 3,128,988 A | * | 4/1964 | Mandroian .............. A61C 1/05 384/110 |
| 5,571,977 A | * | 11/1996 | Kipp ........................ E03F 7/12 73/865.8 |

(Continued)

FOREIGN PATENT DOCUMENTS

| | | | | |
|---|---|---|---|---|
| AT | EP 0656449 A2 | * | 6/1995 | ............. B08B 9/049 |

*Primary Examiner* — Daniel Howell
*Assistant Examiner* — Chwen-Wei Su
(74) *Attorney, Agent, or Firm* — Reed Smith LLP

(57) ABSTRACT

A drilling apparatus for drilling from inside a conduit having at least one service entrance is described. The drilling apparatus comprises a robot; an elongated flexible appliance having a first end and a second end, the elongated flexible appliance connected to the robot; a rotatable drill head connected to the second end of the elongated flexible appliance; the elongated flexible appliance driven by the robot to extend the rotatable drill head inside the service entrance by at least 8 cm and to retract the rotatable drill head out of the at least one service entrance. The apparatus further comprises means to bend the elongated flexible appliance to orient the drill head connected thereto perpendicular to a longitudinal axis of the conduit.

7 Claims, 5 Drawing Sheets

(51) Int. Cl.
*E03F 3/06* (2006.01)
*E21B 43/112* (2006.01)
*F16L 55/179* (2006.01)

(56) References Cited

U.S. PATENT DOCUMENTS

| | | | | |
|---|---|---|---|---|
| 5,674,032 A | * | 10/1997 | Slocum | B23Q 1/0036 408/1 R |
| 5,853,056 A | * | 12/1998 | Landers | E21B 7/061 166/117.5 |
| 2001/0010780 A1 | * | 8/2001 | Matsumoto | F16L 55/265 405/138 |
| 2001/0014281 A1 | * | 8/2001 | Uesugi | F01D 1/32 415/111 |
| 2004/0149066 A1 | * | 8/2004 | Garrec | B25J 18/06 74/490.04 |
| 2006/0000606 A1 | * | 1/2006 | Fields | E21B 49/06 166/264 |
| 2007/0151766 A1 | * | 7/2007 | Butler | E21B 7/18 175/67 |
| 2011/0259460 A1 | * | 10/2011 | Bauer | F16L 55/28 138/97 |
| 2014/0096966 A1 | * | 4/2014 | Freitag | E21B 7/046 166/298 |

* cited by examiner

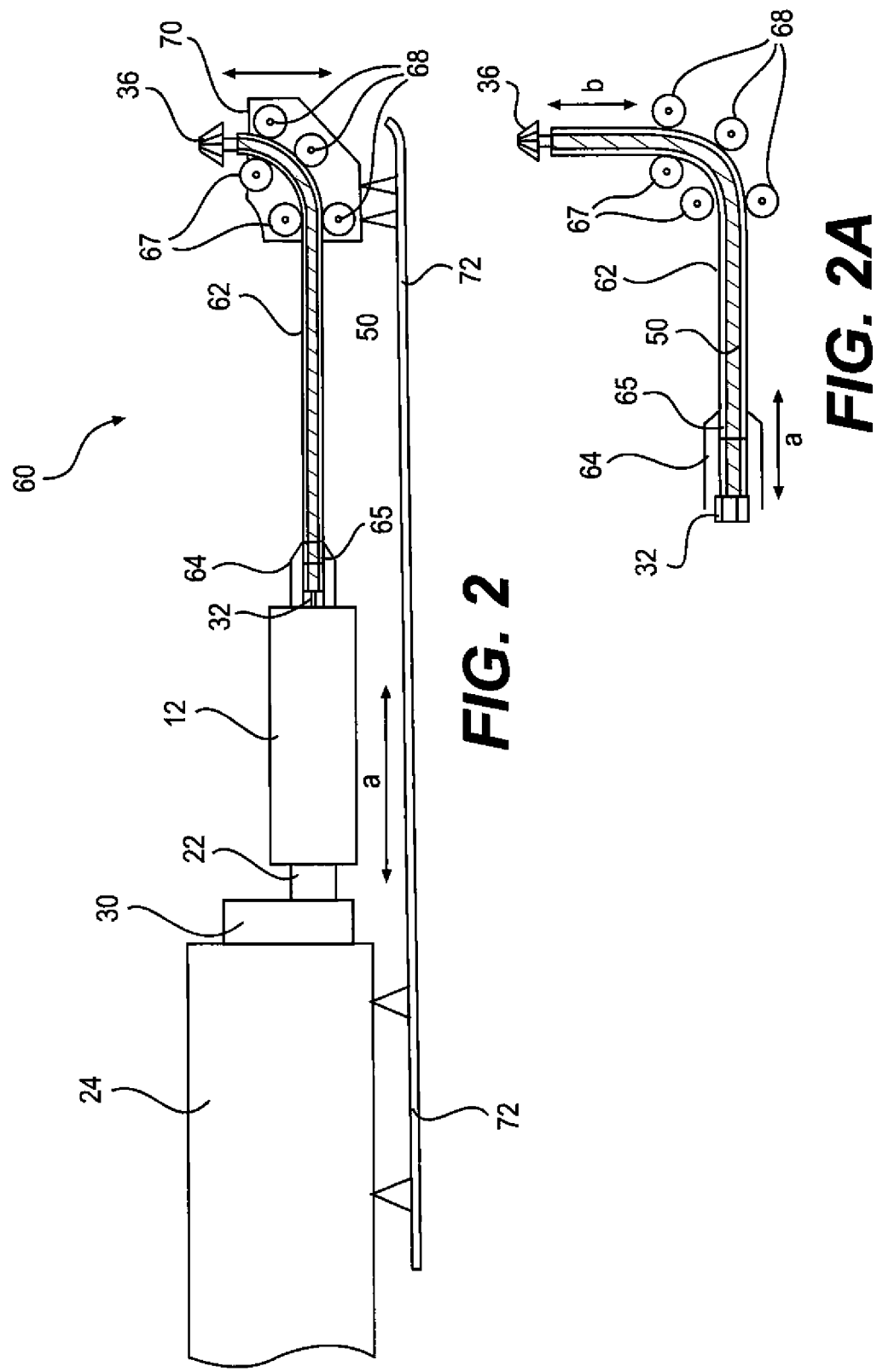

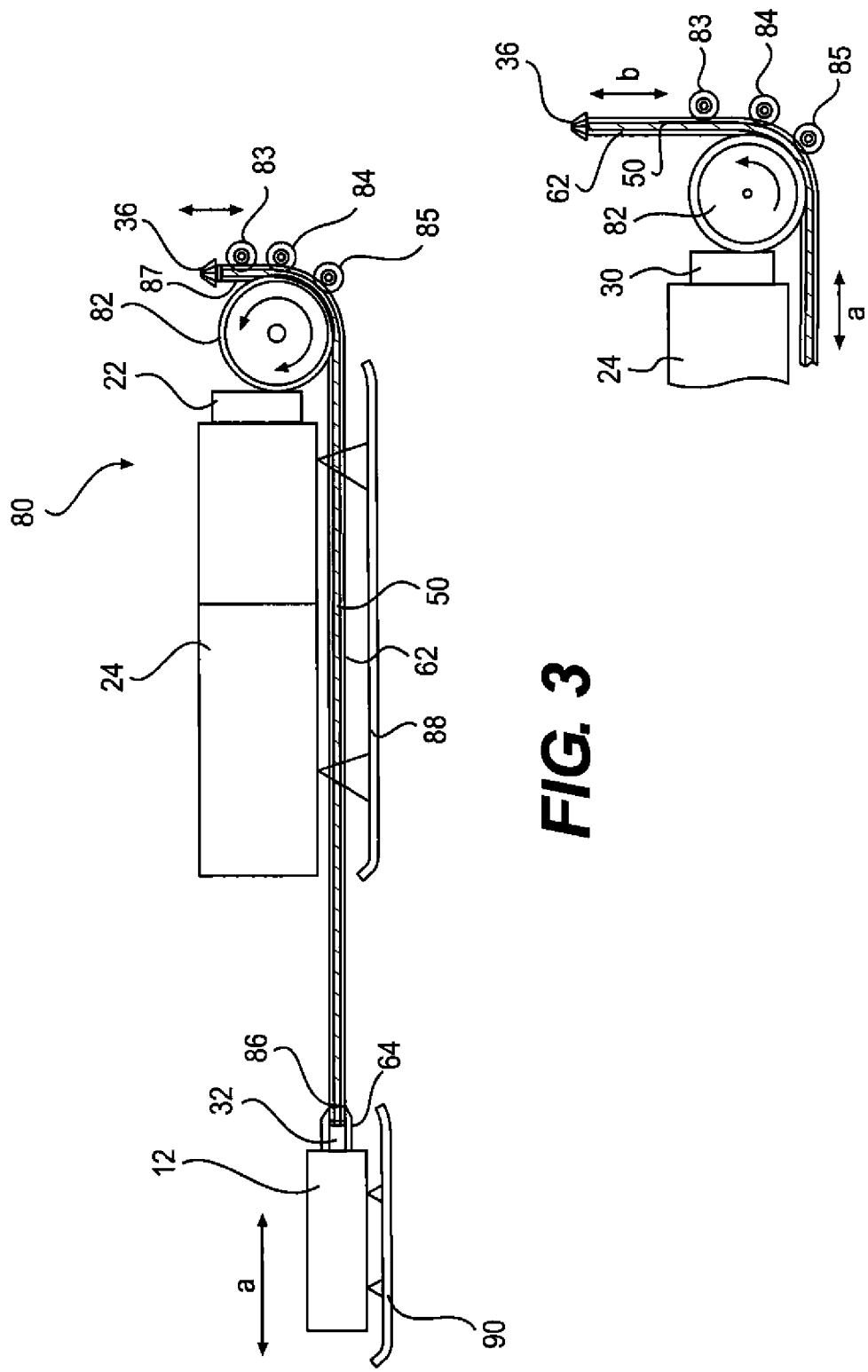

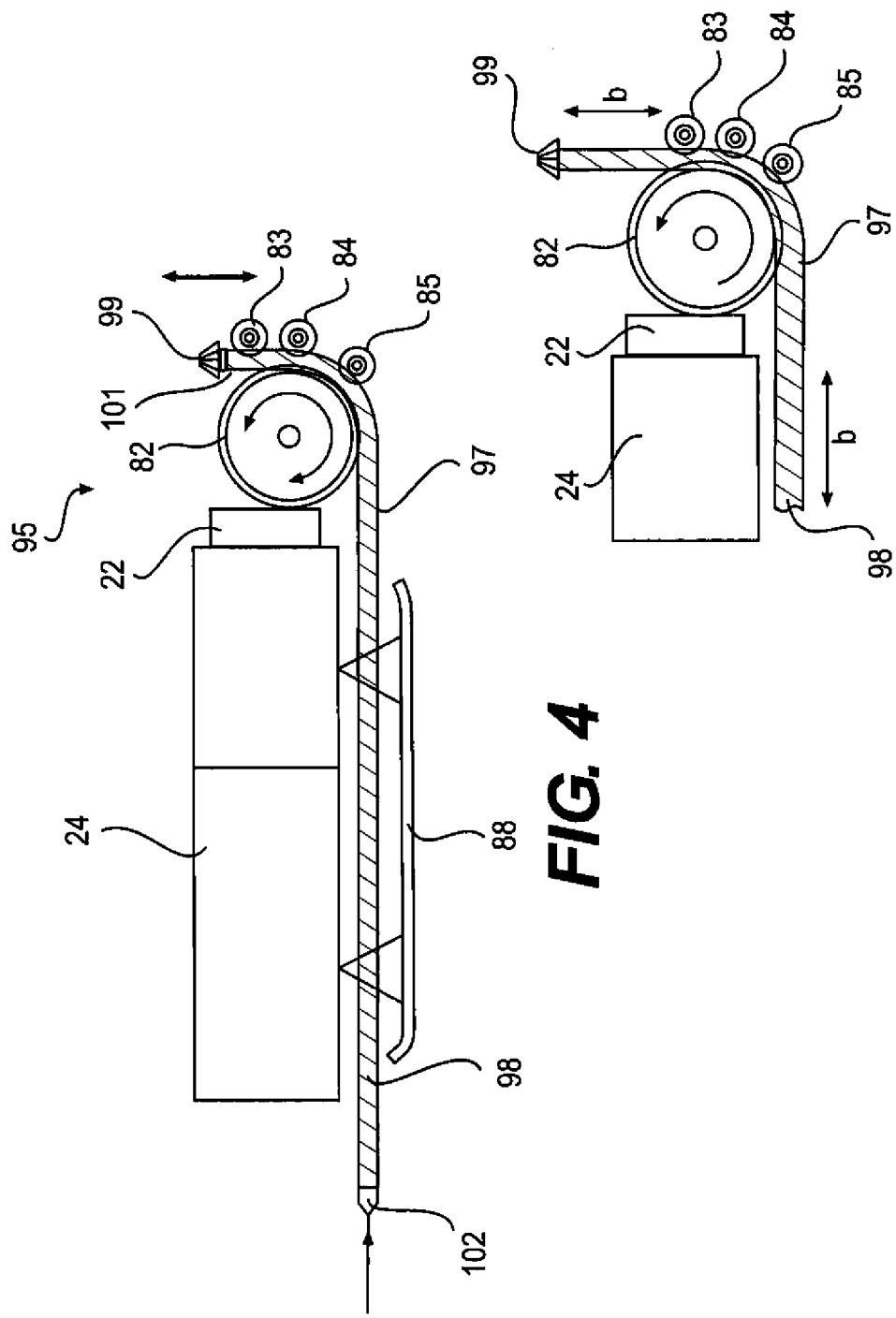

DRILLING APPARATUS

FIELD OF THE INVENTION

The present invention relates to a drilling apparatus for drilling holes from inside a conduit or pipe perpendicular to the longitudinal axis of the conduit or pipe and more specifically for drilling plugged service entrances in an underground water conduit after the underground conduit was rehabilitated with an internal lining.

BACKGROUND OF THE INVENTION

For many years now, technologies have been developed and used to rehabilitate damaged water and sewage conduits. The various technologies basically consist of re-lining the inside walls of existing underground conduits to rehabilitate the underground conduits.

The service entrances of the existing conduit are initially plugged with a water plug carrying a position marker with a plug setting robot controlled by an operator looking through a video camera connected to the plug setting robot. Thereafter the existing conduit is re-lined internally with a flexible tubular liner impregnated with a curable resin which is cured in place with recirculating heated water after insertion in the underground conduit. Once the resin is cured and the re-lining of the existing conduit is done, the water plug can be located with a detection and drilling robot using the position marker of the water plug. Once the center of the water plug is located, the water plug is drilled out using a drill mounted on the robot which is operated by the operator.

The drill mounted on the robot typically consists of a main housing attached to the front portion of the robot that includes a power unit and an actuator for controlling a drilling head positioned at the front of the main housing. The drilling head includes a drill bit extending perpendicular to the drilling head and to the longitudinal axis of the underground conduit. The drilling head is rotatable about the longitudinal axis and also movable back and forth along the same axis such that the operator is able to precisely align the drill bit with the position marker of the water plug blocking the service entrances that may be located in any position around the circumference of the underground conduit. The drilling head is also movable along an axis perpendicular to the main housing such that when the drill bit is properly aligned with the service entrances, the rotating drill bit is actuated to move against the water plug and drill it out by moving the drilling head along that perpendicular axis. The drill head is then retracted thereby opening the previously plugged service entrance.

Problems may arise when during the re-lining process, the curable resin of the tubular liner seeps into the service entrance, cures inside the services entrance deeper than required such that the standard drill bit is not long enough to remove the cured resin and the services entrance remains blocked or partially clogged by cured resin. The length of the drill bit adapted to be mounted onto a drilling head as previously described is limited by the space available inside the underground conduit and it is not possible to install a longer drill bit onto the drilling head to remove resin cured deep inside the service entrance. The depth of insertion of the drill bit inside the service entrance is limited by the maximum extension of the drilling head along the perpendicular axis previously described.

Thus, when resin has seeped deep into the service entrance and the standard drilling system is unable to drill deep enough inside the service entrance, the service entrance remains plugged or partially plugged by the cured resin and the fluid connection cannot be re-established leaving the residence or business to which that particular service entrance is connected without water supply or with limited flow of water which is obviously unacceptable. The only solution is to dig up the ground to reach and replace that particular service entrance at great cost.

Therefore, there is a need for a drilling apparatus adapted to extend deeper and farther inside a plugged service entrance than prior art drilling apparatus.

SUMMARY OF THE INVENTION

It is an object of the present invention to ameliorate at least some of the inconveniences present in the prior art.

In a first aspect, the present invention seeks to provide a drilling apparatus for drilling from inside a conduit having at least one service entrance, the apparatus comprising a robot; an elongated flexible appliance having a first end and a second end, the elongated flexible appliance connected to the robot; a rotatable drill head connected to the second end of the elongated flexible appliance; the elongated flexible appliance driven by the robot to extend the rotatable drill head inside the at least one service entrance by at least 8 cm and to retract the rotatable drill head out of the at least one service entrance. The apparatus further comprises means to bend the elongated flexible appliance to orient the drill head connected thereto perpendicular to a longitudinal axis of the conduit.

In one embodiment, the elongated flexible appliance is a flexible shaft connected at its first end to a motor adapted to impart a rotational motion to the flexible shaft and to the rotatable drill head connected to its second end. the robot further comprises a main body and a tooling head, the tooling head adapted to extend in and out of the main body of the robot, the motor is connected to tooling head of the robot, the extension of the tooling head in and out of the main body of the robot driving the rotatable drill head inside and out of the at least one service entrance.

In one specific aspect of the invention, the flexible shaft is supported inside a hollow tube. In one embodiment, the flexible shaft and the supporting hollow tube move together to drive the rotatable drill head inside and out of the at least one service entrance. In another embodiment, the flexible shaft slides inside the supporting hollow tube to drive the rotatable drill head inside and out of the at least one service entrance.

In another aspect of the invention, the drilling apparatus includes a driving wheel mounted on the robot and engaging a portion of the elongated flexible appliance to impart motion to the elongated flexible appliance and to rotatable drill head connected thereto.

In another aspect of the invention, the drilling apparatus further comprises a series of guiding wheels which together with the driving wheel form a driving path for the elongated flexible appliance and the rotatable drill head connected thereto.

In one specific aspect of the invention, the elongated flexible appliance is connected to a motor which is separate from the robot.

In a further aspect, the elongated flexible appliance is connected to air or water pressure system adapted to impart a rotational motion to the rotatable drill head and the elongated flexible appliance is a pressure hose.

In another aspect of the invention, the drill head is connected to the second end of the pressure hose and includes a series of internal passageways that impart rotational motion to the drill head when pressurized fluid passes through the passageways.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 2 is a schematic side elevational view of a drilling apparatus in accordance with a second embodiment of the invention;

FIG. 2A is a partial side elevational view of the drilling portion of the drilling apparatus of FIG. 2 showing the drilling portion partially extended;

FIG. 3 is a schematic side elevational view of a drilling apparatus in accordance with a third embodiment of the invention;

FIG. 3A is a partial side elevational view of the drilling portion of the drilling apparatus of FIG. 3 showing the drilling portion partially extended;

FIG. 4 is a schematic side elevational view of a drilling apparatus in accordance with a fourth embodiment of the invention;

FIG. 4A is a partial side elevational view of the drilling portion of the drilling apparatus of FIG. 4 showing the drilling portion partially extended;

DETAILED DESCRIPTION OF THE PREFERRED EMBODIMENTS

Figure 1:
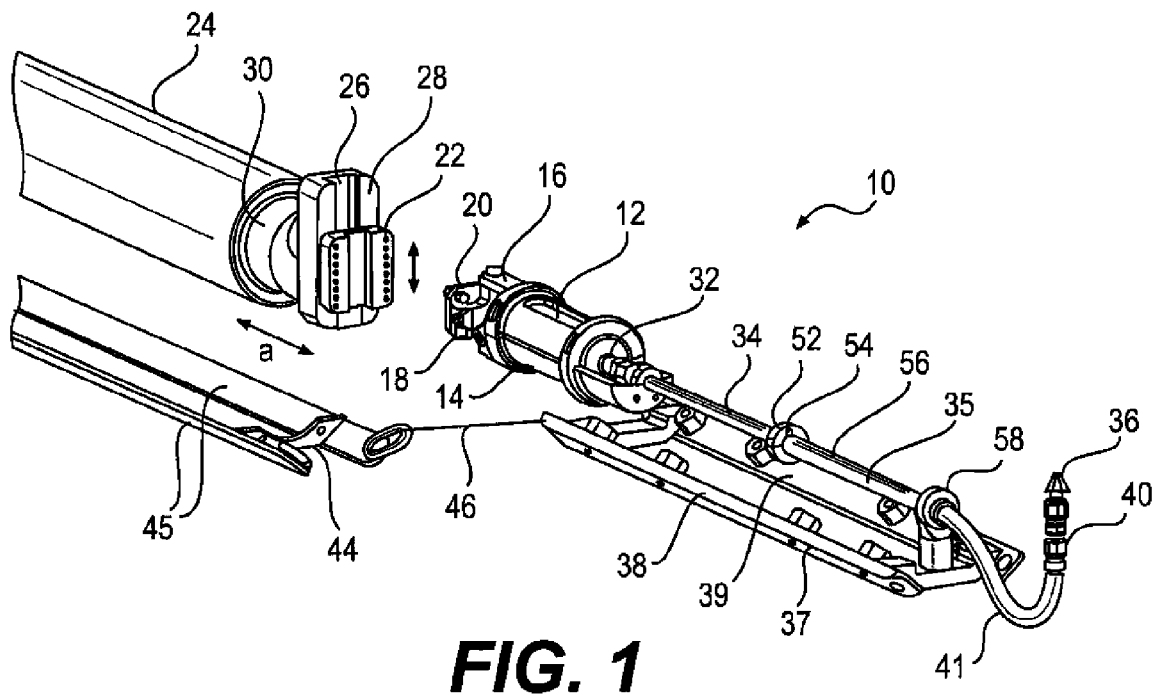
FIG. 1 is an exploded perspective view of a drilling apparatus in accordance with a first embodiment of the invention.

With reference to FIG. 1, there is shown a drilling apparatus 10 in accordance with a first embodiment of the invention. The drilling apparatus 10 comprises an electric motor 12 housed in a rigid casing 14. The electric motor 12 includes a rotating shaft 32 which is connected to a first end of a flexible shaft 50 (FIG. 1A) supported inside a first rigid hollow tube 34; the second end of the flexible shaft 50 being connected to a drill head 36. The first rigid hollow tube 34 is slidably inserted into a second rigid hollow tube 35 and the point of insertion of the first and second rigid hollow tubes 34 and 35 is supported by a first support member 52. The end of the second rigid hollow tube 35 is supported by a second support member 58. The end of the first rigid hollow tube 34 includes a protruding pin 54 which is inserted into a guiding groove 56 of the second rigid hollow tube 35. The protruding pin 54 prevents the first rigid hollow tube 34 from rotating when the flexible shaft 50 is spinning and also acts as a stopper against the support members 54 and 58 to prevent the first rigid hollow tube 34 from exiting the second rigid hollow tube 35 at one end and from going too far at the other end.

The casing 14 of the electric motor 12 and the rigid hollow tubes 34 and 35 are mounted and supported onto a platform 38 comprising a pair of sliding pads 37, 39 adapted for sliding inside an underground conduit. As illustrated in FIG. 1, the front end 40 of rigid hollow tube 35 is bent such that the drill head 36 is perpendicular to the sliding pads 37, 39 and therefore perpendicular to the longitudinal axis of the underground conduit in order to be aimed at the wall of the underground conduit for drilling. The bend 41 of the rigid hollow tube 35 has the largest possible radius in order for the flexible shaft 50 to rotate inside the rigid hollow tube 35 with minimal friction.

The casing 14 is connected to a robot 24 through a pair of mounting brackets 16 each connected to a universal joint 18 itself connected to a second bracket 20 adapted for mounting to a tooling head 22 located at the front end of the robot 24. The tooling head 22 is slidably mounted inside a guiding track 26 of a rotating bracket 28, itself mounted onto a movable arm 30 of the robot 24. The robot 24 is also mounted and supported onto a platform 44 comprising a pair of sliding pads 45 adapted for sliding inside an underground conduit. Platform 44 and platform 38 are connected together via a tension cable 46 of a predetermined length.

Figure 1A:
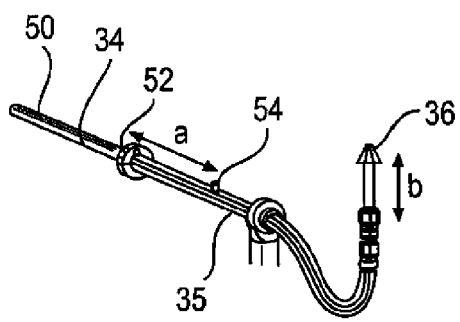
FIG. 1A is a partial perspective view of the drilling portion of the drilling apparatus of FIG. 1 showing the drilling portion partially extended.

In operation, the electric motor 12 is activated to spin the rotating shaft 32 connected to the first end of the flexible shaft 50 thereby spinning the flexible shaft 50 inside a rigid hollow pipe 34 which in turn spins the drill head 36 connected to the second end of the flexible shaft 50. In order to extend the drill head 36 out of the front end 40 of rigid hollow tube 35 as shown in FIG. 1A with arrows 'b', the movable arm 30 of the robot 24 is adapted to extend in and out of the main body of the robot 24 as shown by arrows "a" thereby moving the tooling head 22 and the casing 14 of the electric motor 12 in the same direction, The moving electric motor 12 pushes the first rigid hollow tube 34 forward inside the second rigid hollow tube 35 as shown in FIG. 1A by the same length as the movable arm 30 extending out of the robot 24 and in so doing extend the spinning drill head 36 out of the front end 40 of rigid hollow tube 35 as shown with arrows 'b' by the same length. The drill head 36 is therefore able to drill out the plug plugging the service entrance and extend deep inside the service entrance to drill out any cured resin that may have seeped into the service entrance.

In operation, an operator is looking through a video camera positioned near the front end 40 of rigid hollow tube 35 and the drill head 36 and is able to visually align the drill head 36 with the center of the plugged service entrance by moving the robot along the longitudinal axis of the underground pipe and then rotating bracket 28 until the drill head 36 is aligned perpendicular to the plugged service entrance as previously described. When the drill head 36 is aligned to the plugged service entrance, the operator activates the electric motor 12 to spin the rotating shaft 32 connected to the first end of a flexible shaft 50 thereby spinning the drill head 36. The operator then activates the movable arm 30 in order to move the drill head 36 into contact with the plug plugging the service entrance to drill it out. Once the plug is drilled out, the operator continues the activation of the movable arm 30 and the extension of the drill head 36 to move the drill head 36 deeper inside the service entrance by 8 to 15 cm to make sure that the service entrance is fully reopened and no cured resin remains inside to impede the flow of water. The drill head 36 and flexible shaft 50 are then retracted from the service entrance by retracting the movable arm 30 back to its starting position before moving the drilling apparatus 10 towards another plugged service entrance to be drilled out.

With reference to FIG. 2, there is shown a schematic illustration of a drilling apparatus 60 in accordance with a second embodiment of the invention. The drilling apparatus 60 includes a robot 24 having a movable arm 30 and a tooling head 22 to which is mounted an electric motor 12 similar to the configuration described with reference to drilling apparatus 10 shown in FIG. 1. The electric motor 12 also includes a rotating shaft 32 which is connected to the first end of a flexible shaft 50; the second end of the flexible shaft 50 being connected to a drill head 36. In this particular embodiment, the flexible shaft 50 is positioned inside a semi rigid reinforced hollow tube 62 extending from the electric motor 12 to the drill head 36 which provides support for the flexible shaft 50. The semi rigid reinforced hollow tube 62 is fixedly connected to a mandrel 64 of the electric motor 12 at a first end 65 and is supported and guided at a second end by a series of guiding wheels 67 and 68 mounted onto a support bracket 70 in a configuration that bends the semi rigid reinforced hollow tube 62 by approximately 90 degrees such that the drill head 36 is perpendicular to the longitudinal axis of the underground conduit in order to be aimed at the wall of the underground conduit for drilling. The robot 24 and the support bracket 70 are both mounted onto a common platform 72 adapted for sliding within the underground conduit while the electric motor 12 is free to move back and forth relative to platform 72 as illustrated by arrow "a".

In operation, the electric motor 12 is activated to spin the rotating shaft 32 connected to the first end of the flexible shaft 50 thereby spinning the flexible shaft 50 inside the semi rigid reinforced hollow tube 62 which in turn spins the drill head 36 connected to the second end of the flexible shaft 50. In order to extend the drill head 36 as shown in FIG. 2A with arrows 'b', the movable arm 30 of the robot 24 is adapted to extend in and out of the main body of the robot 24 as shown by arrows "a" thereby moving the tooling head 22 and the electric motor 12 in the same direction. The moving electric motor 12 pushes the entire assembly including the semi rigid reinforced hollow tube 62 and the flexible shaft 50 through the series of guiding wheels 67 and 68 as illustrated by arrow 'b' by the same length as the movable arm 30 extending out of the robot 24 and in so doing pushes the spinning drill head 36 into contact with the plug plugging the service entrance to drill it out and continue deep inside the service entrance to drill out any cured resin that may have seeped into the service entrance.

As previously described with reference to FIGS. 1 and 1A, in operation, an operator is looking through a video camera positioned near the support bracket 70 and the drill head 36 and is able to visually align the drill head 36 with the center of the plugged service entrance by moving the robot 24 along the longitudinal axis of the underground pipe until the drill head 36 is aligned perpendicular to the plugged service entrance. When the drill head 36 is aligned with the plugged service entrance, the operator activates the electric motor 12 to spin the rotating shaft 32 connected to the first end of a flexible shaft 50 thereby spinning the drill head 36. The operator then activates the movable arm 30 in order to move the drill head 36 into contact with the plug plugging the service entrance to drill it out. Once the plug is drilled out, the operator continues the activation of the movable arm 30 in order to extend the assembly including the semi rigid reinforced hollow tube 62 and the flexible shaft 50 to move the drill head 36 deeper inside the service entrance by 8 to 15 cm to make sure that the service entrance is fully reopened and no cured resin remains inside to impede the flow of water. The assembly including the semi rigid reinforced hollow tube 62, the flexible shaft 50 and the drill head 36 are then retracted from the service entrance by retracting the movable arm 30 back to its starting position before moving the drilling apparatus 60 towards another plugged service entrance to be drilled out.

With reference to FIG. 3, there is shown a schematic illustration of a drilling apparatus 80 in accordance with a third embodiment of the invention. The drilling apparatus 80 includes a robot 24 having a tooling head 22 to which is mounted an electric driving wheel 82 powered by the robot electric system. In front of the driving wheel 82 is a set of three guiding wheels 83, 84 and 85 which together with the driving wheel 82 form a driving path for an assembly comprising a semi rigid reinforced hollow tube 62, a flexible shaft 50 and a drill head 36 similar to the assembly previously described with reference to FIG. 2. Behind the robot 24 is an electric motor 12 also including a rotating shaft 32 which is connected to the first end 86 of the flexible shaft 50; the second end 87 of the flexible shaft 50 being connected to the drill head 36. The flexible shaft 50 is positioned inside the semi rigid reinforced hollow tube 62 extending from the electric motor 12 to the drill head 36 which provides support for the flexible shaft 50. The semi rigid reinforced hollow tube 62 is fixedly connected to a mandrel 64 of the electric motor 12 at the first end 86 and is supported and guided at its second end 87 by the driving path formed by driving wheel 82 and the three guiding wheels 83, 84 and 85 in a configuration that bends the semi rigid reinforced hollow tube 62 by approximately 90 degrees such that the drill head 36 is perpendicular to the longitudinal axis of the underground conduit in order to be aimed at the wall of the underground conduit for drilling. The robot 24 is mounted onto a platform 88 adapted for sliding within the underground conduit while the electric motor 12 is supported by an independent platform 90 also adapted for sliding within the underground conduit but free to move back and forth relative to platform 88 as illustrated by arrow "a".

In operation, the electric motor 12 is activated to spin the rotating shaft 32 connected to the first end 86 of the flexible shaft 50 thereby spinning the flexible shaft 50 inside the semi rigid reinforced hollow tube 62 which in turn spins the drill head 36 connected to the second end 87 of the flexible shaft 50. In order to extend the drill head 36 as shown in FIG. 3A with arrows 'b', the driving wheel 82, which engages the semi rigid reinforced hollow tube 62, is activated to rotate slowly in the counter clockwise direction thereby moving the assembly including the semi rigid reinforced hollow tube 62, the flexible shaft 50 and the drill head 36 upward and at the same time pulling on the electric motor 12 attached thereto, and in so doing pushes the spinning drill head 36 into contact with the plug plugging the service entrance to drill it out and continue deep inside the service entrance to drill out any cured resin that may have seeped into the service entrance.

As previously described with reference to FIGS. 1 and 2, in operation, an operator is looking through a video camera positioned near the driving wheel 82 and the drill head 36 and is able to visually align the drill head 36 with the center of the plugged service entrance by moving the robot 24 along the longitudinal axis of the underground pipe until the drill head 36 is aligned perpendicular to the plugged service entrance. When the drill head 36 is aligned with the plugged service entrance, the operator activates the electric motor 12 to spin the rotating shaft 32 connected to the first end 86 of a flexible shaft 50 thereby spinning the drill head 36. The operator then activates the driving wheel 82 in the counter clockwise direction in order to move the drill head 36 into contact with the plug plugging the service entrance to drill it out. Once the plug is drilled out, the operator continues the activation of the driving wheel 82 in order to extend the assembly including the semi rigid reinforced hollow tube 62 and the flexible shaft 50 to move the drill head 36 deeper inside the service entrance by 8 to 15 cm to make sure that the service entrance is fully reopened and no cured resin remains inside to impede the flow of water. The assembly including the semi rigid reinforced hollow tube 62, the flexible shaft 50 and the drill head 36 is then retracted from the service entrance by activating the driving wheel 82 in the clockwise direction which moves the assembly back to its starting position and pushes the electric motor 12 back to its starting position. The drilling apparatus 80 may then be moved towards another plugged service entrance to be drilled out.

With reference to FIG. 4, there is shown a schematic illustration of a drilling apparatus 95 in accordance with a fourth embodiment of the invention. The drilling apparatus 95 includes a robot 24 having a tooling head 22 to which is mounted an electric driving wheel 82 powered by the robot electric system identical to the one shown and described with reference to FIG. 3. In front of the driving wheel 82 is a set of three guiding wheels 83, 84 and 85 which together with the driving wheel 82 form a driving path for a drilling assembly 97. The drilling assembly 97 consists of a reinforced flexible pressure hose 98 having a drill head 99 connected to its outermost end 101 which is driven by air or water pressure supplied through the pressure hose 98. The end 102 is connected to an air or water pressure system powered by a motor connected to an air or a hydraulic pump located outside the underground conduit or pipe being rehabilitated. The robot 24 is mounted onto a platform 88 adapted for sliding within the underground conduit and the flexible pressure hose 98 passes underneath the robot 24.

The drilling assembly 97 is supported and guided at its outermost end 101 by the driving path formed by driving wheel 82 and the three guiding wheels 83, 84 and 85 in a configuration that bends the flexible pressure hose 98 by approximately 90 degrees such that the drill head 99 is perpendicular to the longitudinal axis of the underground conduit in order to be aimed at the wall of the underground conduit for drilling.

In operation, an air or water pump (not shown) is activated and pressurised fluid is fed into the flexible pressure hose 98 which in turn spins the drill head 99 connected to its outermost end 101. In order to extend the drill head 99 as shown in FIG. 4A with arrows 'b', the driving wheel 82, which engages the pressure hose 98, is activated to rotate slowly in the counter clockwise direction thereby moving the drilling assembly 97 and therefore the drill head 99 upward and in so doing pushes the spinning drill head 99 into contact with the plug plugging the service entrance to drill it out and continue deep inside the service entrance to drill out any cured resin that may have seeped into the service entrance.

As previously described with reference to FIGS. 1 to 3, in operation, an operator is looking through a video camera positioned near the driving wheel 82 and the drill head 99 and is able to visually align the drill head 99 with the center of the plugged service entrance by moving the robot 24 along the longitudinal axis of the underground pipe until the drill head 99 is aligned perpendicular to the plugged service entrance. When the drill head 99 is aligned with the plugged service entrance, the operator activates the air or water pump (not shown) to spin the drill head 99. The operator then activates the driving wheel 82 in the counter clockwise direction in order to move the drill head 99 into contact with the plug plugging the service entrance to drill it out. Once the plug is drilled out, the operator continues the activation of the driving wheel 82 in order to extend the drilling assembly 97 to move the drill head 99 deeper inside the service entrance by 8 to 15 cm to make sure that the service entrance is fully reopened and no cured resin remains inside to impede the flow of water. The drilling assembly 97 is then retracted from the service entrance by activating the driving wheel 82 in the clockwise direction which moves the drilling assembly 97 back to its starting position. The drilling apparatus 95 may then be moved towards another plugged service entrance to be drilled out.

Figure 5B:
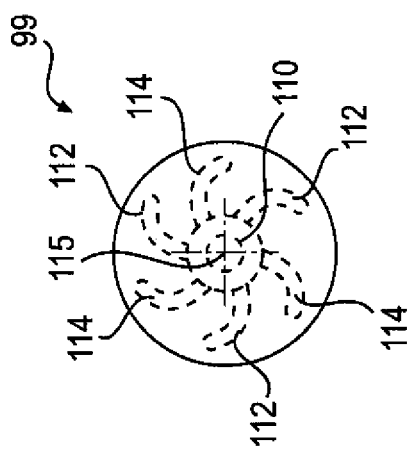
FIG. 5B is a top plan view of the drill head shown in FIG. 5 with internal passageways shown in dotted lines.
Figure 5A:
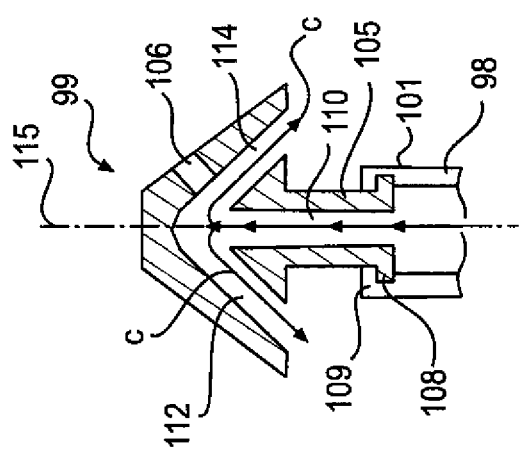
FIG. 5A is a cut-away view of the drill head shown in FIG. 5 taken along the axis of rotation 115.
Figure 5:
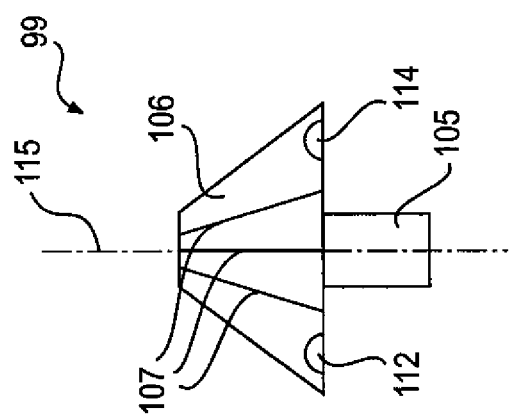
FIG. 5 is a side elevational view of a drill head shown in FIG. 4 in isolation.

With reference to FIG. 5, 5A and 5B, the drilling head 99 comprises a shaft portion 105 and a head portion 106. The head portion 106 includes on its outer surface a series of teeth 107 adapted for drilling. The shaft portion 105 is connected to the outermost end 101 of the flexible pressure hose 98 via a bearing 108 held in place by a shoulder 109 within the flexible pressure hose 98. The shaft portion 105 of the drill head 99 includes a central passageway 110 and the head portion 106 includes a series of angled passageways 112, 114 connected to the central passageway 130. As illustrated in FIG. 5B, the angled passageways 112 and 114 are curvilinear and are at an angle relative to the axis of rotation 115 of the drill head 99. When pressurised fluid from the flexible pressure hose 98 enters the central passageway 110, it is directed into the angled passageways 112, 114 as illustrated by arrows "c" which has the effect of rotating the drill head 99 due to the angle of the passageways relative to the axis of rotation 115 of the drill head 99.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A drilling apparatus for drilling from inside a conduit having at least one service entrance, the apparatus comprising:
   a robot having an extendible arm;
   a motor mounted onto the extendible arm of the robot
   an elongated flexible shaft having a first end and a second end, the first end of the elongated flexible shaft connected to the motor;
   a rotatable drill head connected to the second end of the elongated flexible shaft;
   the elongated flexible shaft driven by the motor to impart rotational motion to the drill head;
   the extendible arm of the robot extending out of the robot to move the motor away from the robot thereby pushing the elongated flexible shaft and extending the rotatable drill head inside the at least one service entrance and the extendible arm of the robot retracting back into the robot to move the motor back towards the robot thereby pulling the elongated flexible shaft to retract the rotatable drill head out of the at least one service entrance.

2. A drilling apparatus as defined in claim 1, wherein the rotatable drill head is extended inside the at least one service entrance by at least 8 cm.

3. A drilling apparatus as defined in claim 1 further comprising means to bend the elongated flexible shaft to orient the drill head connected thereto perpendicular to a longitudinal axis of the conduit.

4. A drilling apparatus as defined in claim 3, wherein the elongated flexible shaft is bent by approximately 90°.

5. A drilling apparatus as defined in claim 3, wherein the flexible shaft is supported inside a rigid hollow tube bent such that the drill head is perpendicular to the longitudinal axis of the conduit.

6. A drilling apparatus as defined in claim 5, wherein the flexible shaft slides inside the rigid hollow tube to drive the rotatable drill head inside and out of the at least one service entrance.

7. A drilling apparatus as defined in claim 6, wherein the robot further comprises a main body and a tooling head, the tooling head adapted to extend in and out of the main body of the robot, the motor is connected to tooling head of the robot, the extension of the tooling head in and out of the main body of the robot moving the motor and driving the flexible shaft and the rotatable drill head inside and out of the at least one service entrance.

* * * * *